United States Patent
Rizzon et al.

(10) Patent No.: US 10,271,481 B2
(45) Date of Patent: Apr. 30, 2019

(54) STRAPPING SYSTEM FOR AGRICULTURAL IMPLEMENT

(71) Applicant: CNH Industrial America LLC, New Holland, PA (US)

(72) Inventors: Dominick Brian Rizzon, Ephrata, PA (US); Joshua Lee Lounder, Ephrata, PA (US); Robert D. Crandall, Lancaster, PA (US); Shaun Ahrens O'Donnell, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/301,165

(22) PCT Filed: Mar. 26, 2015

(86) PCT No.: PCT/US2015/022848
§ 371 (c)(1),
(2) Date: Sep. 30, 2016

(87) PCT Pub. No.: WO2015/153300
PCT Pub. Date: Oct. 8, 2015

(65) Prior Publication Data
US 2017/0013784 A1    Jan. 19, 2017

Related U.S. Application Data

(60) Provisional application No. 61/972,806, filed on Mar. 31, 2014.

(51) Int. Cl.
*A01F 15/04* (2006.01)
*A01F 15/08* (2006.01)
(Continued)

(52) U.S. Cl.
CPC ............. *A01F 15/14* (2013.01); *A01F 15/042* (2013.01); *A01F 15/08* (2013.01); *A01F 15/0875* (2013.01); *B65B 27/12* (2013.01)

(58) Field of Classification Search
CPC ........ A01F 15/14; A01F 15/04; A01F 15/042; A01F 15/0825; A01F 15/08; A01F 2015/143; B65B 27/12; B30B 9/3032
See application file for complete search history.

(56) References Cited

U.S. PATENT DOCUMENTS

| 236,253 A | * | 1/1881 | Phares | ................. B30B 9/3053 100/100 |
| 3,450,028 A | | 6/1969 | Goland et al. | |

(Continued)

FOREIGN PATENT DOCUMENTS

| FR | 2254483 A1 | 7/1975 | | |
| WO | WO 2014151790 A1 | * | 9/2014 | ............. A01F 15/14 |

*Primary Examiner* — Jimmy T Nguyen
(74) *Attorney, Agent, or Firm* — Peter K. Zacharias; Patrick M. Sheldrake

(57) ABSTRACT

An agricultural baler includes a baling chamber configured to receive a compressible material. The baler includes a plunger proximate a first end of the baling chamber and configured to move within the baling chamber to compress the compressible material into a bale. The baler also includes a rear door assembly having one or more rails positioned at a second end of the baling chamber, opposite the first end. The rear door assembly has a rear door with parallel tracks configured to receive and to guide a strap around the second end of the baling chamber to facilitate surrounding the bale with the strap. The rear door is slidingly coupled to the one or more rails and is configured to move along the one or more rails between a closed position and an open position.

11 Claims, 9 Drawing Sheets

(51) Int. Cl.
*A01F 15/14* (2006.01)
*B65B 27/12* (2006.01)

(56) References Cited

U.S. PATENT DOCUMENTS

| | | | |
|---|---|---|---|
| 3,768,396 A | 10/1973 | Coleman | |
| 3,769,485 A | 10/1973 | Harada et al. | |
| 3,827,349 A * | 8/1974 | Gilman | B30B 9/30 100/190 |
| 4,154,158 A | 5/1979 | Leslie et al. | |
| 4,254,703 A | 3/1981 | Fulton et al. | |
| 4,256,032 A * | 3/1981 | Davis | B65B 13/06 100/26 |
| 4,520,720 A | 6/1985 | Urban et al. | |
| 4,665,817 A * | 5/1987 | Simpson | B30B 9/06 100/116 |
| 5,778,772 A | 7/1998 | Schwede | |
| 5,816,141 A * | 10/1998 | Aylsworth | B30B 9/3007 100/214 |
| 5,899,139 A * | 5/1999 | Dorman | B30B 9/3096 100/100 |
| 6,499,525 B1 | 12/2002 | Lai | |
| 6,782,679 B2 | 8/2004 | Helland et al. | |
| 6,990,894 B2 | 1/2006 | Lininger et al. | |
| 7,127,986 B2 * | 10/2006 | Daniel | B65B 27/12 100/26 |
| 7,526,995 B2 | 5/2009 | Actis et al. | |
| 7,690,297 B1 * | 4/2010 | Sagen | B30B 9/3003 100/19 R |
| 7,757,468 B2 | 7/2010 | Kastner | |
| 2011/0185924 A1 * | 8/2011 | Lanning | B30B 9/301 100/215 |
| 2012/0017780 A1 * | 1/2012 | Haberstroh | B65B 27/12 100/8 |
| 2016/0021828 A1 | 1/2016 | O'Donnell et al. | |

* cited by examiner

STRAPPING SYSTEM FOR AGRICULTURAL IMPLEMENT

CROSS REFERENCE TO RELATED APPLICATION

This application claims priority from and the benefit of U.S. Provisional Application Ser. No. 61/972,806, entitled "STRAPPING SYSTEM FOR AGRICULTURAL IMPLEMENT," filed Mar. 31, 2014, which is hereby incorporated by reference in its entirety.

BACKGROUND OF THE INVENTION

The present invention relates generally to the field of packaging compressible materials, and more particularly, to systems for strapping bales of crop materials.

Generally, rectangular or square balers are utilized to compress certain materials into rectangular bales to facilitate storage and handling of the material. Usually, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale during subsequent processing operations. In addition, the tensile strength of twine may be too low to effectively bind compressed materials in certain applications.

SUMMARY OF THE INVENTION

In one embodiment, an agricultural baler includes a baling chamber configured to receive a compressible material. The baler includes a plunger proximate a first end of the baling chamber and configured to move within the baling chamber to compress the compressible material into a bale. The baler includes a rear door assembly having one or more rails positioned at a second end of the baling chamber, opposite the first end. The rear door assembly also includes a rear door with parallel tracks configured to receive and to guide a strap around the second end of the baling chamber to facilitate surrounding the bale with the strap. The rear door is slidingly coupled to the one or more rails and is configured to move along the one or more rails between a closed position in which an opening at the second end of the baling chamber is blocked and an open position which enables the compressible material to exit the baling chamber via the opening.

In one embodiment, an agricultural baler includes a baling chamber configured to receive a compressible material. The baling chamber has a first wall opposing a second wall, and each of the first wall and the second wall comprises a respective fixed track extending along a longitudinal axis of the baling chamber. The baler also includes a rear door configured to move along a vertical axis of the baling chamber between a closed position and an open position. The rear door has a moveable track that is configured to align with the respective fixed tracks of the first wall and the second wall to facilitate transfer of a strap from the fixed track of the first wall to the fixed track of the second wall while the rear door is in a closed position relative to the baling chamber.

In one embodiment, a method for baling an agricultural crop material includes moving a rear door from an open position to a closed position relative to the baling chamber, wherein the rear door blocks the agricultural crop material from exiting the baling chamber while in the closed position, and enables the agricultural crop material to exit the baling chamber while in the open position. The method also includes feeding an end of a strap into a track of the rear door while the rear door is in the closed position, and propelling the end of the strap through the track of the rear door from a first side of the baling chamber to a second side of the baling chamber, opposite the first side, while the rear door is in the closed position relative to the baling chamber. The method also includes releasing the strap from the track by moving the rear door from the closed position to the open position relative to the baling chamber to facilitate surrounding a bale of the agricultural crop material with the strap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems for strapping a bale of material using a relatively high-strength strap. In particular, various components are provided within a baler to efficiently surround the bale with the strap and to seal the strap securely around the bale. The described embodiments may provide certain advantages over traditional baling systems that use twine to contain bales. For example, the high strength and/or the large surface area of the strap may enable the strap to hold the bale in the desired size and density more efficiently than twine, thereby facilitating easy storage and handling of the bale. Additionally, unlike twine, the strap may be easily removed from the bale during subsequent processing operations. Furthermore, certain components described herein (such as, for example, a rear door having multiple parallel tracks and being configured to move relative to the baling chamber) may enable efficient strapping of the bale, while substantially reducing or eliminating twisting of the strap as the strap is applied to and sealed around the bale.

Figure 1:
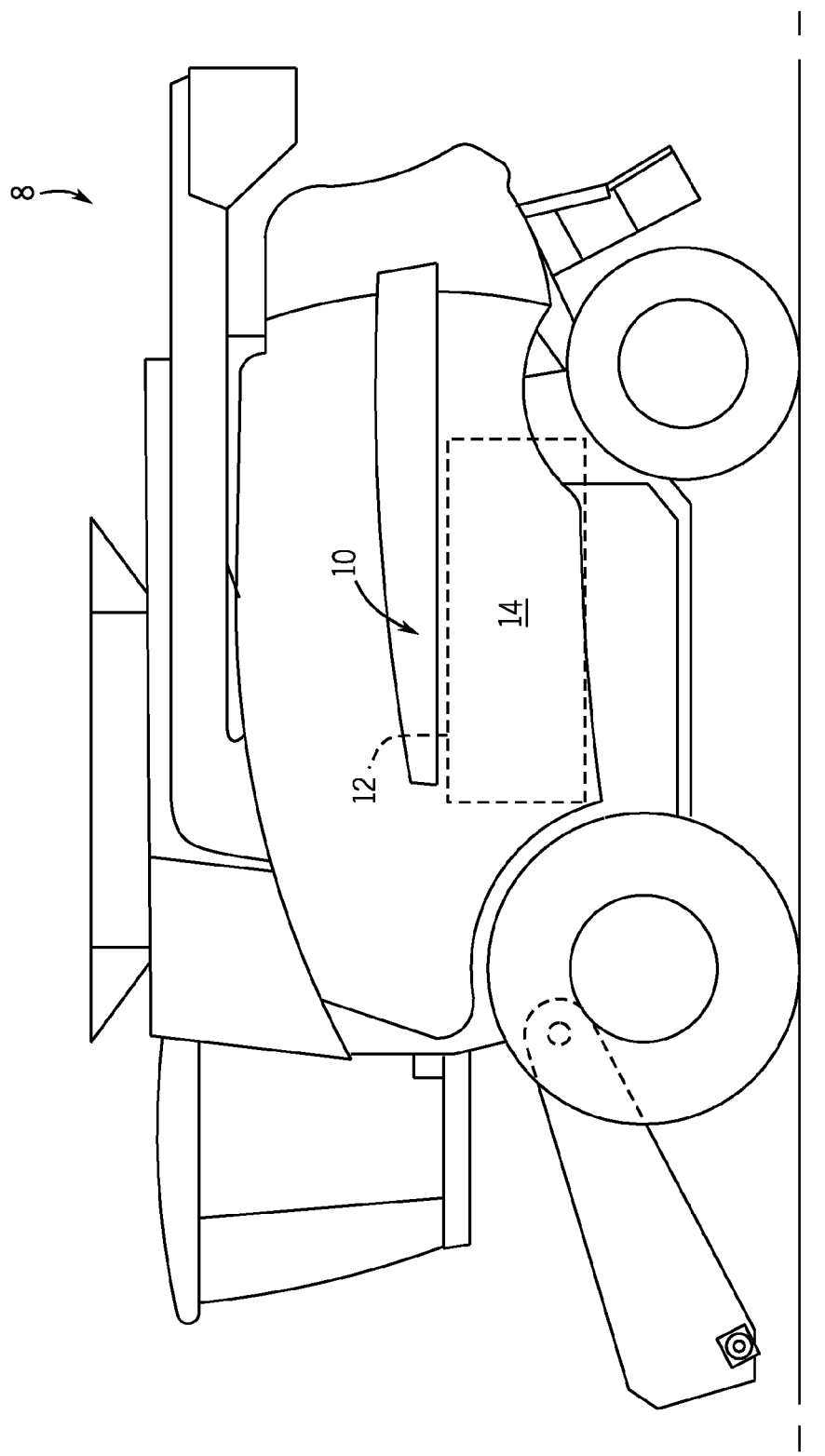
FIG. 1 is a side view of an embodiment of a self-contained vehicle including a baler.

Turning now to the drawings, FIG. 1 is a side view of a self-contained vehicle 8 including a baler 10. As illustrated, a frame 12 defines a baling chamber 14 that is supported and/or mounted within or on the self-contained vehicle 8. Material may flow into the baling chamber 14 via a conveyance system, where the material is baled in a manner described below. Thus, the baler 10 may be configured to collect and bale material as the self-contained vehicle 8 travels through the field.

Figure 2:
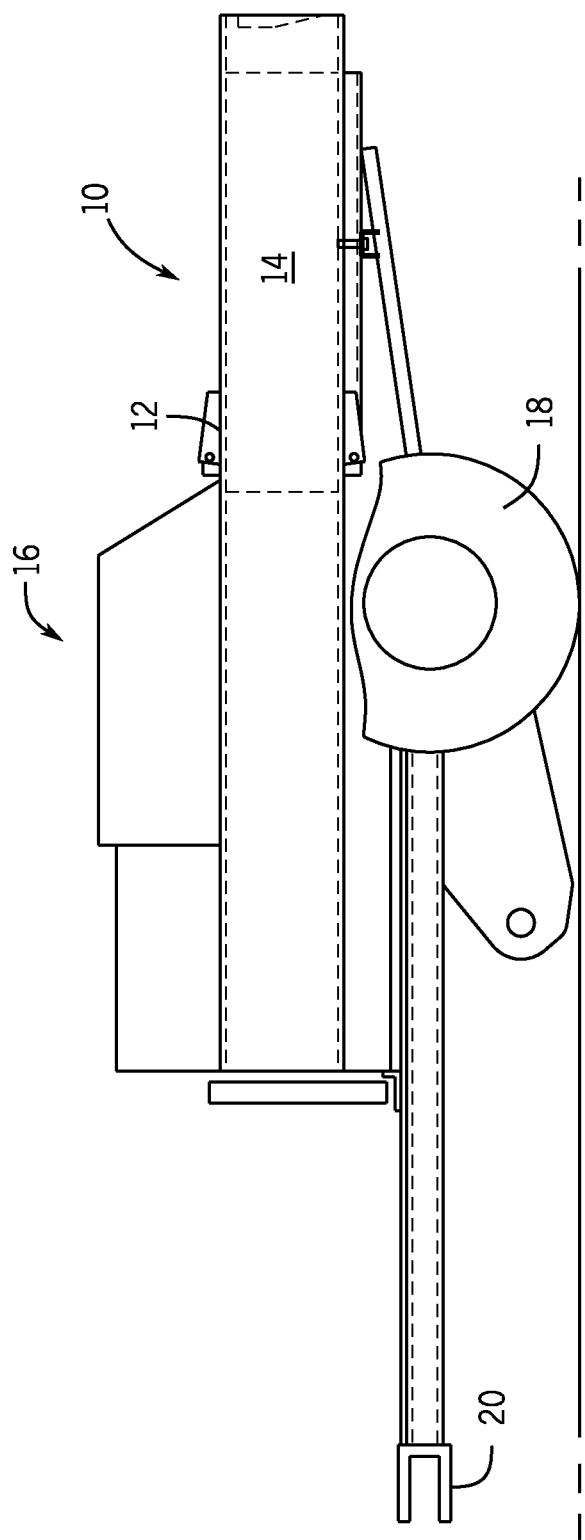
FIG. 2 is a side view of an embodiment of a towable implement having a baler, in which the towable implement is configured to be towed by a tow vehicle.

FIG. 2 is a side view of an embodiment of a towable implement 16 having the baler 10, in which the towable implement 16 is configured to be towed by a tow vehicle. As shown, the towable implement 16 includes the baler 10 having the frame 12 defining the baling chamber 14. The towable implement 16 may be ground-supported by wheels 18 and may be coupled to a tow vehicle (e.g., a harvester, a tractor, etc.) by a projection 20 that is configured to connect the towable implement 16 to the tow vehicle. Thus, the towable implement 16 may be pulled through a field. In such a configuration, the baler 10 collects and bales material as the towable implement 16 travels through the field behind the tow vehicle. It should be understood that the baler 10 disclosed herein may be incorporated in and/or utilized with any suitable implement or vehicle.

Figure 3:
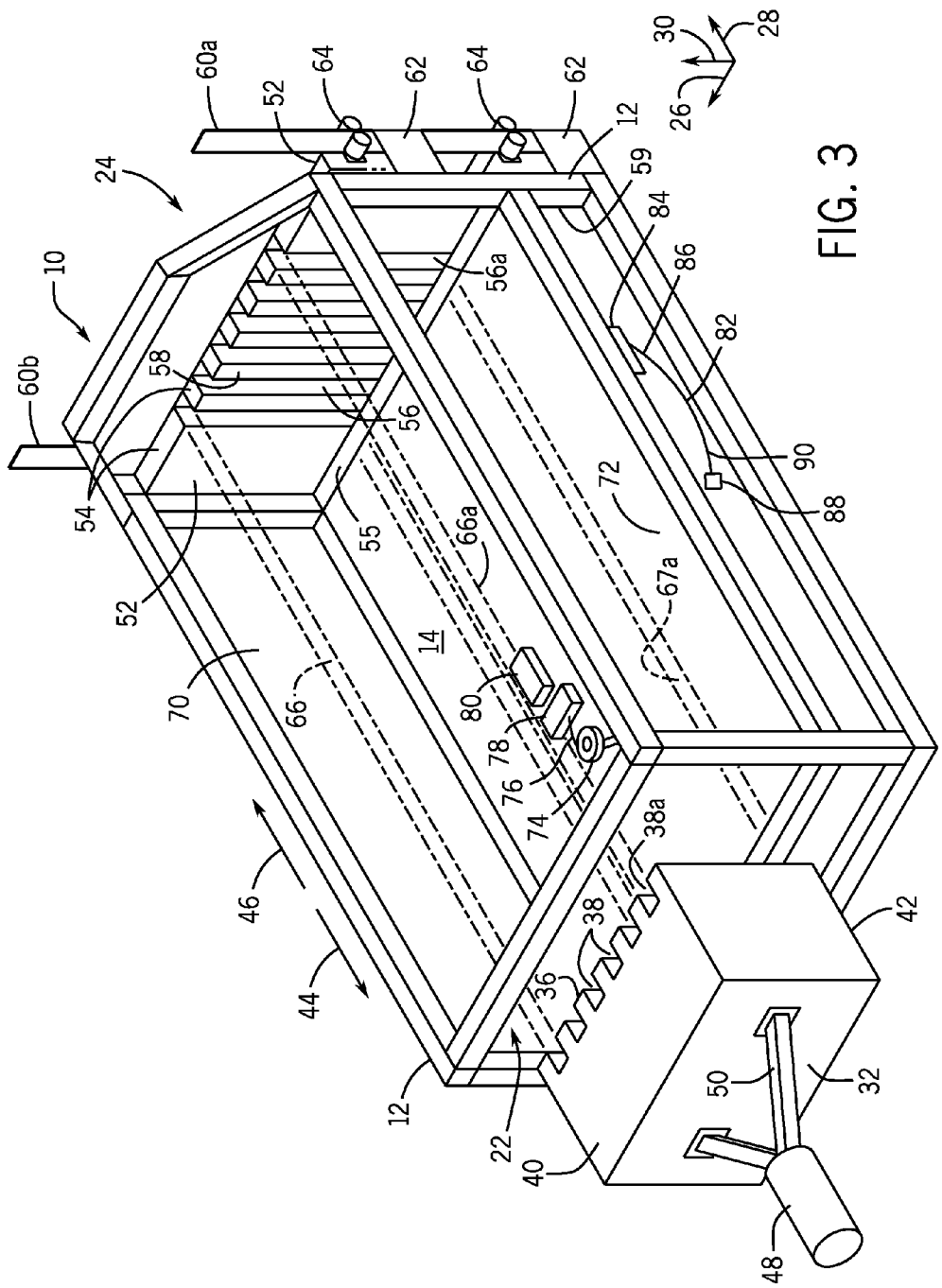
FIG. 3 is a perspective view of an embodiment of a portion of a baler configured to form and to strap rectangular bales of material.

FIG. 3 is a perspective view of an embodiment of a portion of the baler 10 configured to form and to strap rectangular bales of material (e.g., crop materials, such as hay, straw, grasses, silage, corn stalks, tobacco, cotton, biomass, etc.). In the illustrated embodiment, the baler 10 includes the frame 12 defining the baling chamber 14. The baling chamber 14 includes a first end 22 (e.g., forward end) and a second end 24 (e.g., rear end), which may generally relate to the direction of travel of the baler 10. For example, the baler 10 may be part of the towable implement 16 and pulled through a field by a tow vehicle, collecting and baling the crop material as the baler 10 travels through the field. The baler 10 may also be included in a self-propelled chassis, or may be part of the self-contained vehicle 8, as discussed above. When connected to the tow vehicle or included in the self-contained vehicle 8, the forward end 22 is proximal to the tow vehicle or to the forward end of the self-contained vehicle 8, while the rear end 24 is distal from the tow vehicle or from the rear end of the self-contained vehicle 8. The baler 10 and/or the baling chamber 14 may be further defined as having a lateral axis 26, a longitudinal axis 28, and a vertical axis 30. Although the illustrated embodiment includes a horizontal rectangular baler 10, it should be understood that the systems disclosed herein may be readily adapted for use in other types of balers 10, such as vertical balers. Additionally, although the illustrated embodiment includes a baler 10 configured to bind the bale around the lateral axis 26, in other embodiments the baler 10 may be configured to bind the bale around the longitudinal axis 28 and/or the vertical axis 30, as discussed in more detail below.

In the baler 10 of FIG. 3, the material enters the baling chamber 14 at the forward end 22, and the material is compressed within the baling chamber 14 by a forward plunger 32. The forward plunger 32 then moves axially (e.g., along the longitudinal axis 28) within the baling chamber 14 to drive the compressible material rearwardly toward the rear end 24. In the illustrated embodiment, the forward plunger 32 includes a material-facing surface 36. As shown, the forward plunger 32 includes multiple parallel slots 38 open to the baling chamber 14. As illustrated, the slots 38 extend from a first end 40 (e.g., top end) of the forward plunger 32 to a second end 42 (e.g., bottom end) of the forward plunger 32, and the slots 38 are generally aligned with the vertical axis 30 of the baler 10 and spaced apart from one another along the lateral axis 26 substantially evenly across the material-facing surface 36 of the forward plunger 32. As shown, six slots 38 are provided on the material-facing surface 36 of the forward plunger 32, although two, three, four, five, seven, eight, nine, ten, or more slots may be provided in other embodiments. Although shown as having slots 38, it should be understood that the forward plunger 32 and the material-facing surface 36 of the forward plunger 32 may have any suitable form for compressing the material within the baling chamber 14. For example, the forward plunger 32 may include a series of separate, spaced apart bars, or in other embodiments, the forward plunger 32 may have a uniform, flat material-facing surface 36.

Regardless of its form, the forward plunger 32 is configured to move axially within the baling chamber 14 in a reciprocating motion along the longitudinal axis 28 of the baler 10. In other words, the forward plunger 32 is configured to move in a first direction 44 (e.g., forward direction or forwardly) and in a second direction 46 (e.g., rearward direction or rearwardly). In the illustrated embodiment, the forward plunger 32 is coupled to an actuator 48 via one or more arms 50. The actuator 48 may be a hydraulic cylinder or a pneumatic cylinder, or the actuator 48 may include a piston that drives a flywheel to power a gearbox. The gearbox may, in turn, rotate crank arms that are coupled to the arms 50, thereby facilitating motion of the forward plunger 32. Regardless of its form, the actuator 48 is configured to control the reciprocating motion of the forward plunger 32.

In the illustrated embodiment, the baler 10 includes a rear door 52 (e.g., a wall or a support structure) disposed at or proximate to the rear end 24 of the baling chamber 14 and opposite the forward plunger 32. As shown, the rear door 52 has a first end 54 (e.g., a top end) and a second end 55 (e.g., a bottom end). The rear door 52 includes multiple parallel tracks 56 (e.g., vertical tracks or movable tracks) having a material-facing surface 58 and configured to open toward the baling chamber 14. The tracks 56 are generally aligned with the vertical axis 30 of the baler 10 and are spaced evenly apart from one another across the rear door 52 along the lateral axis 26. Furthermore, in the illustrated embodiment, each track 56 of the rear door 52 is disposed opposite (e.g., aligned with) one corresponding slot 38 of the forward plunger 32.

The rear door 52, and thus the tracks 56 of the rear door 52, is configured to move or travel relative to the baling chamber 14. The rear door 52 is coupled to one or more actuators 59 (e.g., hydraulic cylinders, pneumatic cylinders, etc.) configured to facilitate movement of the rear door 52 relative to the baling chamber 14. In certain embodiments, a rack and pinion system may be provided to convert rotation of a motor into linear movement to cause the rear door 52 to move relative to the baling chamber 14.

As shown, the rear door 52 is configured to move vertically (e.g., parallel to the vertical axis 30 of the baler 10) along rails 60 positioned proximate to the rear end 24 of the baling chamber 14. In the embodiment of FIG. 3, two rails 60 (e.g., a first rail 60a and a second rail 60b) are spaced apart from one another along the lateral axis 26 and extend parallel to the vertical axis 30 of the baler 10, although it should be understood that more or fewer rails may be provided. As shown, brackets 62 couple each of the rails 60 to the frame 12. The rails 60, the brackets 62, and/or the frame 12 may be coupled to one another via any suitable technique, such as crimping, welding, or any suitable fastener (e.g., bolts). In some embodiments, the brackets 62 may be omitted and the rails 60 may be coupled to the frame 12 directly by crimping, welding, or fastening (e.g., via any suitable fastener, such as bolts) the rails 60 to the frame 12. The rear door 52 includes or is coupled to bearings 64 configured to facilitate movement of the rear door 52 along the one or more rails 60. During operation, the rear door 52 may move along the vertical axis 30 of the baler 10 between an open position and a closed position relative to the baling chamber 14 via the bearings 64 moving (e.g., sliding, rotating, or the like) along the rails 60, as described in more detail below. The rear door 52, the tracks 56, the rails 60, the brackets 62, and/or the bearings 64 may form or be part of a rear door assembly 65 that enables movement of the rear door 52 relative to the baling chamber 14.

As shown in FIG. 3, the baling chamber 14 also has a top wall 70 and a bottom wall 72, opposite the top wall 70. In the illustrated embodiment, the top wall 70 has multiple parallel top tracks 66 (e.g., top horizontal tracks or top fixed tracks) and the bottom wall 72 has multiple parallel bottom tracks 67 (e.g., bottom horizontal tracks or bottom fixed tracks). The top tracks 66 and/or the bottom tracks 67 may be open to the baling chamber 14 and/or may be fixed relative to the baling chamber 14. As shown, the top tracks 66 and the bottom tracks 67 extend along the longitudinal axis 28 of the baler 10 and are fixed (e.g., do not move) relative to the baling chamber 14. The tracks 56 of the rear door 52, the top tracks 66, and/or the bottom tracks 67 may form or be part of a track assembly 68. The top tracks 66 and/or the bottom tracks 67 may extend along some or all of the length of the baling chamber 14 so as to accommodate the various axial positions of the forward plunger 32, and to align with the slots 38 of the forward plunger 32 as the forward plunger 32 moves axially (e.g., along the longitudinal axis 28) within the baling chamber 14. The top tracks 66 and/or the bottom tracks 67 also align with the tracks 56 of the rear door 52 when the rear door 52 is in a closed position, as discussed in more detail below.

The slots 38 formed in the forward plunger 32, the tracks 56 along the rear door 52, the top tracks 66, and/or the bottom tracks 67 align with one another so as to surround, or substantially surround, the baling chamber 14 while the rear door 52 is in a closed position. More specifically, the forward plunger 32 has a first slot 38a that aligns with a corresponding first track 56a of the rear door 52, a corresponding top track 66a, and a corresponding bottom track 67 to substantially surround the baling chamber 14. As discussed in more detail below, such a configuration enables a strap to be directed or routed around the baling chamber 14 to strap the compressible material within the baling chamber 14 into a bale. As noted above, in some embodiments, two, three, four, five, six, or more slots 38 may be provided in the forward plunger 32, and a corresponding number of tracks 56 may be provided in the rear door 52, and/or a corresponding number of top tracks 66 and/or bottom tracks 67 may be provided in the top wall 70 or bottom wall 72, respectively.

In the illustrated embodiment, the baler 10 includes a spool 74 configured to store and to provide a strap 76 (e.g., a band, a belt, a wire, or the like) for strapping the material within the baling chamber 14. In certain embodiments, the spool 74 may be accessible and/or removable to facilitate replacement and/or installation of the strap 76. As illustrated, the spool 74 provides the strap 76 to a strap feeding assembly 78, which is configured to direct and/or to propel the strap 76 around at least a portion of the baling chamber 14. For example, the strap feeding assembly 78 propels the strap 76 through at least a portion of the top track 66 of the top wall 70, through the track 56 of the rear door 52 in order to transfer the strap 76 across the baling chamber 14 (e.g., from the top wall 70 to the bottom wall 72), and through the bottom track 67 of the bottom wall 72. As shown in FIG. 3, the baler 10 also includes a sealing assembly 80, which is configured to receive and/or to capture the strap 76, and to seal one portion of the strap 76 to another portion of the strap 76 to form the strap 76 into a sealed loop around the bale, as discussed in more detail below.

In certain embodiments, one or more of the spool 74, the strap feeding assembly 78, and the sealing assembly 80 are coupled to the frame 12 of the baler 10. The spool 74, the strap feeding assembly 78, and/or the sealing assembly 80 may be arranged in any suitable configuration. For example, the strap feeding assembly 78 may be forward of the sealing assembly 80 (e.g., closer to the first end 22 of the baling chamber 14), or the strap feeding assembly 78 may be rearward of the sealing assembly 80 (e.g., closer to the second end 24 of the baling chamber 14). Furthermore, the spool 74, the strap feeding assembly 78, and/or the sealing assembly 80 may be disposed adjacent to the top wall 70 of the baling chamber 14, in certain embodiments. Although one spool 74, one strap feeding assembly 78, and one sealing assembly 80 are shown in FIG. 3 for clarity, it should be understood that multiple sets of these components may be provided within the baler 10 to surround the bale with multiple straps 76. For example, as shown in FIG. 3, the spool 74, the strap feeding assembly 78, and the sealing assembly 80 are aligned with the first top track 66a of the top wall 70. However, a separate spool 74, strap feeding assembly 78, and sealing assembly 80 may be provided and aligned with each of the top tracks 66. Thus, multiple straps 76 may be directed or routed through the tracks 56, top tracks 66, and/or bottom tracks 67 of the track assembly 68 and/or slots 38 of the forward plunger 32 and sealed around the bale, as described in more detail below.

As noted above, although the illustrated embodiments show systems for strapping the bale about the lateral axis 26 of the baler 10, the systems disclosed herein may be readily adapted for strapping the bale about the longitudinal axis 28 and/or the vertical axis 30. For example, to strap the bale about the vertical axis 30, the slots 38 may extend across the material-facing surface 36 of the forward plunger 32 such that the slots 38 are aligned with the lateral axis 26 of the baler 10 and are parallel to the top end 40 and to the bottom end 42 of the forward plunger 32. Similarly, the tracks 56 may extend across the material-facing surface 58 of the rear door 52 such that the tracks 56 are aligned with the lateral axis 26 of the baler 10 and are parallel to the top end 54 and to the bottom end 55 of the rear door 52. In such configurations, the strap 76 may be propelled through the slots 38 laterally across the forward plunger 32 and the tracks 56 of the rear door 52. Additionally, in such configurations, rather than top tracks 66 being formed in the top wall 70 and the bottom tracks 67 being formed in the bottom wall 72, the top tracks 66 and/or the bottom tracks 67 may extend along a first side wall and a second side wall, opposite the first side wall, of the baling chamber 14 between the forward plunger 32 and the rear door 52. Furthermore, the spool 74, the strap feeding assembly 78, and/or the sealing assembly 80 may be disposed on the first side wall of the baling chamber 14, for example. The components may function together to surround the bale with the strap 76 about the vertical axis 30 of the baler 10, and the components and system may be oriented and adapted for strapping the bale about the vertical axis 30.

The strap 76 may be formed from any suitable relatively high-strength material. For example, the strap 76 may have a strength of about 150 kilograms-force (kgf) to about 1500 kgf. In some embodiments, the strap 76 may have a strength of about 300 kgf to about 1200 kgf. In certain embodiments, the strap 76 may be formed from carbon steel, stainless steel, aluminum, or plastics, such as polypropylene or polyester. The strap 76 may have any suitable cross-sectional geometry and may have any suitable width or diameter. For example, the strap 76 may be a band or a belt having a substantially polygonal (e.g., square or rectangular) cross-sectional shape with a width of between approximately 1 centimeter (cm) and about 8 cm. By way of another example, the strap 76 may be a wire having a substantially round or circular cross-sectional shape with a diameter between approximately 2 millimeters (2 mm) and 6 mm, in some embodiments. In some embodiments, the baler 10 is configured to form bales that are about 2 to about 3 meters long (along the longitudinal axis 28) by about 1 to about 2 meters wide (along the lateral axis 26) by about 0.5 to about 1 meters tall (along the vertical axis 30), and the strap 76 is of a suitable strength to securely strap bales of this size.

Additionally, the baler 10 depicted in FIG. 3 includes a needle 82, which may be generally disposed proximate to the bottom wall 72 of the baling chamber 14. The needle 82 is configured to move through the baling chamber 14, and in some embodiments, the needle 82 may move through the baling chamber 14 along an arcuate path. In the illustrated embodiment, the needle 82 is configured to rotate about an attachment 84 coupled to a first end 86 of the needle 82. Additionally, in certain embodiments, the needle 82 may be coupled to a gripping assembly 88 disposed generally near (e.g., proximate to) a second end 90 of the needle 82. The gripping assembly 88 of the needle 82 is configured to receive and to grip the strap 76. The needle 82 and the gripping assembly 88 may have any of a variety of configurations and may serve any of a variety of functions, as described in more detail below. For example, the gripping assembly 88 of the needle 82 may be configured to grip the strap 76 as the rear door 52 is moved vertically (e.g., along the vertical axis 30) to an open position to enable the strap 76 to exit the track 56 of the rear door 52. By way of another example, the needle 82 may be configured to transport the strap 76 from the bottom wall 72 to the top wall 70 of the baling chamber 14 to wrap the strap 76 around the bale and/or to transfer the strap 76 to the sealing assembly 80.

Figure 4:
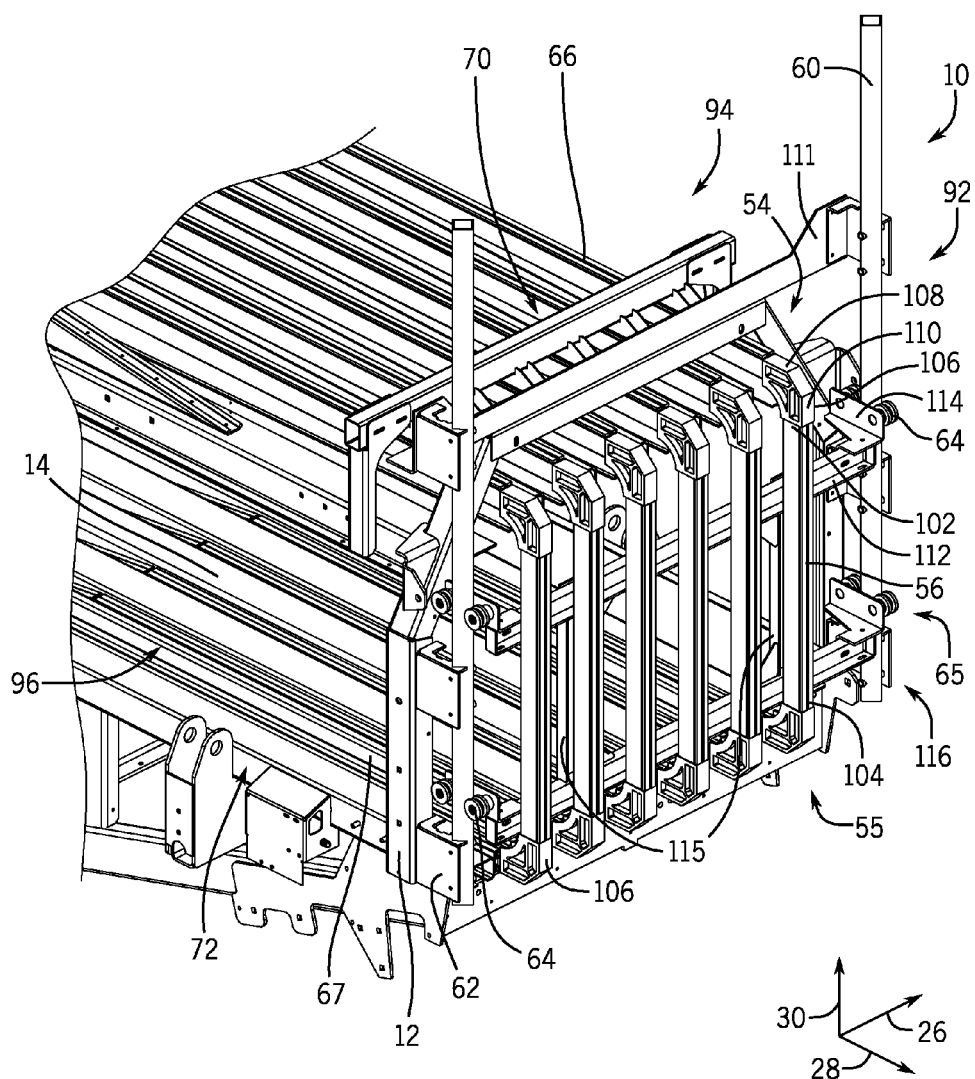
FIG. 4 is a perspective view of an embodiment of a portion of a baler with a rear door in a closed position relative to a baling chamber of the baler.

FIG. 4 is a rear perspective view of an embodiment of the baler 10 having the rear door 52 in a closed position 92. While in the closed position 92, the rear door 52 extends between the top wall 70, the bottom wall 72, a first side wall 94, and a second side wall 96 of the baling chamber 14. In the closed position 92, the rear door 52 blocks material from exiting through the second end 24 of the baling chamber 14 and/or facilitates transfer of the strap 76 from the top tracks 66 of top wall 70 to the bottom tracks 67 of the bottom wall 72 of the baling chamber 14. The illustrated rear door 52 includes six generally parallel tracks 56 extending along the vertical axis 30 of the baler 10 and spaced apart from one another along the lateral axis 26. Each track 56 of the rear door 52 extends from a first end 102 proximate a top end 54 of the rear door 52 to a second end 104 proximate to a bottom end 55 of the rear door 52. Furthermore, the track 56 extends linearly (e.g., along a straight line) between the first end 102 and the second end 104. The first end 102 of each track 56 of the rear door 52 is adjacent to the top track 66 of the top wall 70 and the second end 102 of the track 56 of the rear door 52 is adjacent to the bottom track 67 of the bottom wall 72 while the rear door 52 is in the closed position 92.

As shown, a connecting element 106 is positioned at the first end 102 and at the second end 104 of each track 56 to facilitate alignment of the track 56 of the rear door 52 with the top track 66 of the top wall 70 and the bottom track 67 of the bottom wall 72 while the rear door 52 is in the closed position 92. The connecting elements 106 may have any suitable shape or configuration for aligning the track 56 of the rear door 52 with the corresponding top track 66 and the corresponding bottom track 67. As shown, the connecting elements 106 extend from a generally horizontal portion 108 to a generally vertical portion 110. The connecting elements 106 may have any structure suitable for receiving, constraining, and guiding the strap 76 between the tracks 56 of the rear door 52 and the corresponding top track 66 and the corresponding bottom track 67, as well as for releasing the strap 76 to enable the strap 76 to surround the bale. For example, the connecting elements 106 may include the track, such as a curved track or a segmented track (e.g., a horizontal segment and a vertical segment coupled to one another).

As noted above, the rear door 52 may be coupled to the frame 12 of the baler 10 via any suitable technique. In FIG. 4, two rails 60 are provided at or proximate to the second end 24 of the baling chamber 14 to support and/or to guide the rear door 52 as the rear door 52 moves along the vertical axis 30 relative to the baling chamber 14. In the depicted embodiment, each of the rails 60 is coupled to the frame 12 via brackets 62, which are rigidly fixed to the frame 12 and/or to the two rails 60. A support bar 111 is positioned proximate the top wall 70 of the baling chamber 14. The support bar 111 extends between and is coupled to the two rails 60 via brackets 62. The support bar 111 is configured to provide structural support to the rails 60 as the rear door 52 moves along the two rails 60.

As shown, the tracks 56 are mounted to a crossbar 112 positioned generally orthogonal relative to the tracks 56 of the rear door 52 and extending laterally (e.g., along the lateral axis 26) between the two rails 60. The bearings 64 are mounted on a linkage 114 that is coupled to the crossbar 112 of the rear door 52. A support 115 extends between adjacent crossbars 112. It should be understood that the various components of the rear door assembly 65 may be coupled to one another via any suitable technique, such as via crimping, welding, or fasteners (e.g., bolts). Additionally, some components shown in FIG. 4 may be omitted. For example, in some embodiments, the linkage 114 may be omitted and the bearings 64 may be directly coupled to the crossbar 112 via crimping, welding, or fastening (e.g., via any suitable fastener, such as bolts) the bearings 64 to the crossbar 112. The crossbar 112, the linkage 114, the support 115, and the bearings 64 may be part of or form a rear door frame 116, and thus, the rear door 52 may include the tracks 56, the connecting elements 106, and/or the rear door frame 116. Additionally, the rear door assembly 65 may include the rear door 52 (e.g., the tracks 56, the connecting elements 106, and/or the rear door frame 116 and associated components), as well as the rails 60, the brackets 62, the one or more actuators 59, and the support bar 111, for example.

Figure 5:
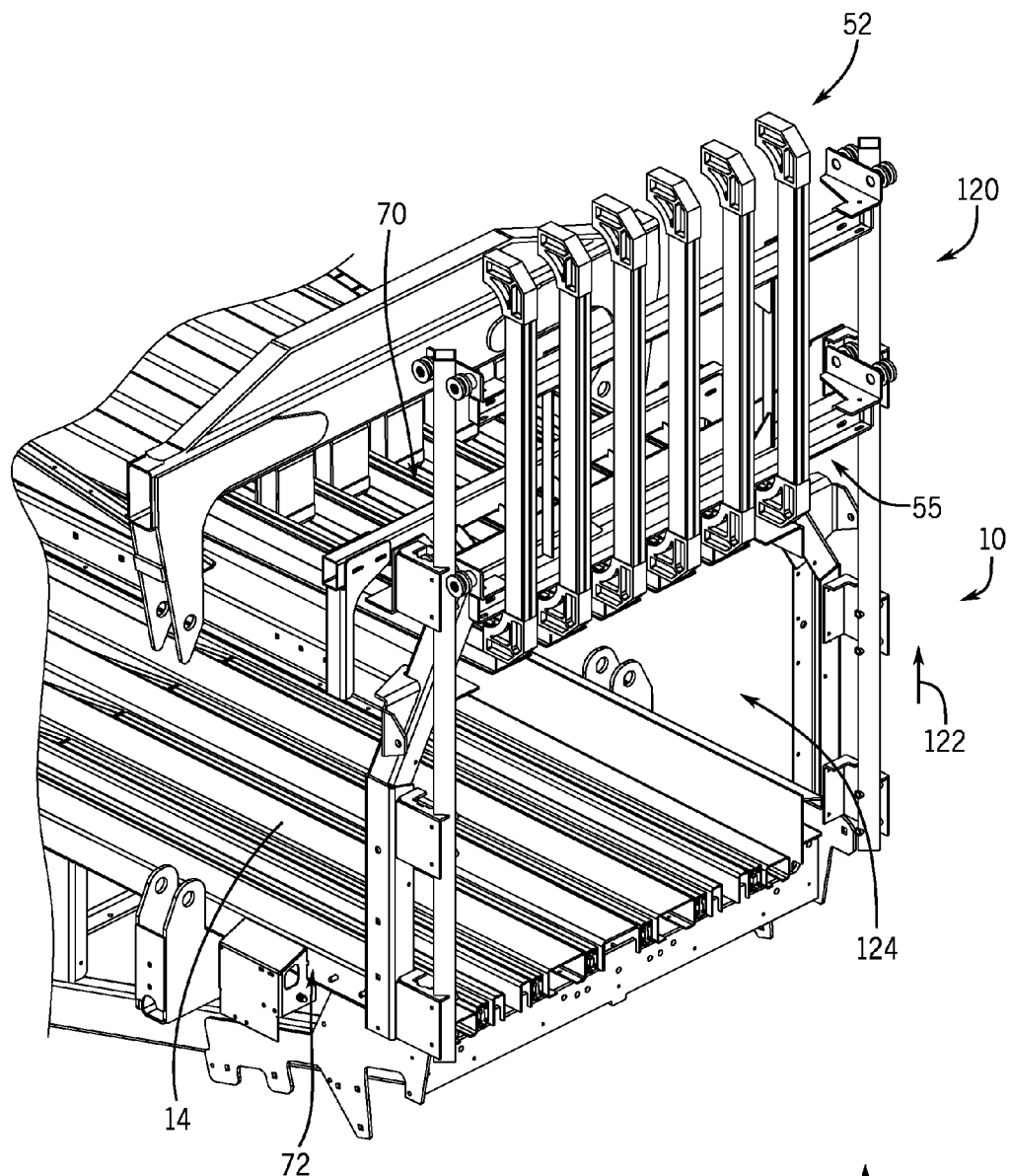
FIG. 5 is a perspective view of the portion of the baler of FIG. 4 with the rear door in an open position relative to the baling chamber of the baler.

FIG. 5 is a rear perspective view of an embodiment of the baler 10 of FIG. 4 with the rear door 52 in an open position 120 relative to the baling chamber 10. As discussed in more detail below, the rear door 52 is configured to move from the closed position 92 to the illustrated open position 120, as shown by arrow 122. In the open position 120, the rear door 52 does not block the material from exiting the second end 24 of the baling chamber 14, but rather, enables the material to exit through an opening 124 at the second end 24 of the baling chamber 14. In the open position 120, the rear door 52 does not extend between the top wall 70 and the bottom wall 72, but rather, is generally positioned above the top wall 70 of the baling chamber 14. Thus, in the open position 120, the bottom end 55 of the rear door 52 is positioned proximate to the top wall 70 of the baling chamber 14.

Figure 6:
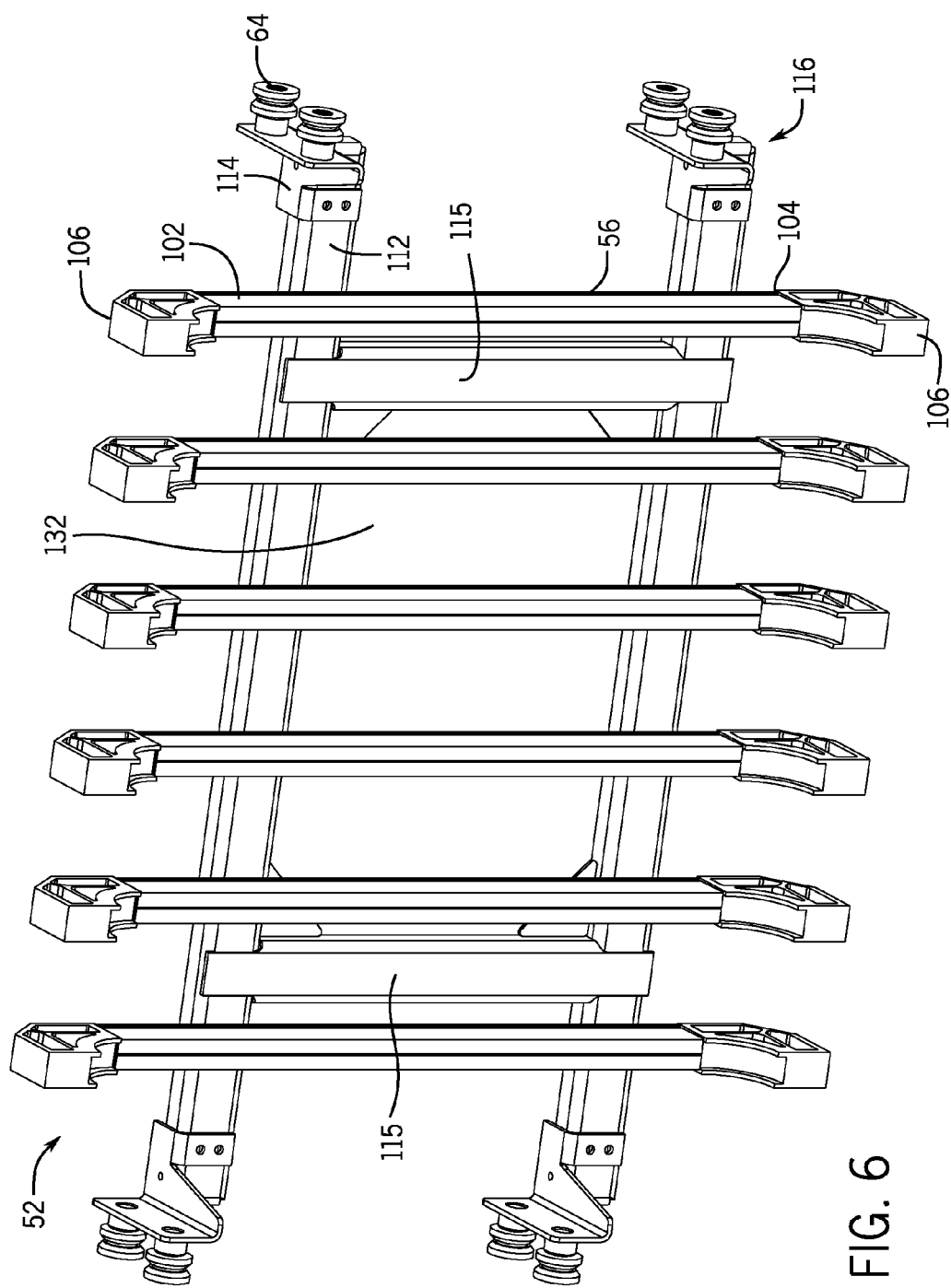
FIG. 6 is a front perspective view of the rear door of FIG. 4 configured to facilitate strapping bales of material.

FIG. 6 is front perspective view of the rear door 52 of FIG. 4 configured to facilitate strapping bales of material. As shown, six generally parallel tracks 56 are spaced apart from one another along the lateral axis 26 (e.g., a gap 132 may be provided between adjacent tracks 56), and each track 56 extends between the first end 102 and the second end 104 along the vertical axis 30. A connecting element 106 is positioned at the first end 102 and at the second end 104 of each track 56 to facilitate aligning the tracks 56 of the rear door 52 with corresponding top tracks 66 of the top wall 70 and bottom tracks 67 of the bottom wall 72, as discussed above. The tracks 56 of the rear door 52 are mounted to the crossbars 112 extending between the linkages 114 of the rear door frame 116. In the illustrated embodiment, the support bar 115 couples adjacent crossbars 112 to one another.

Figure 7:
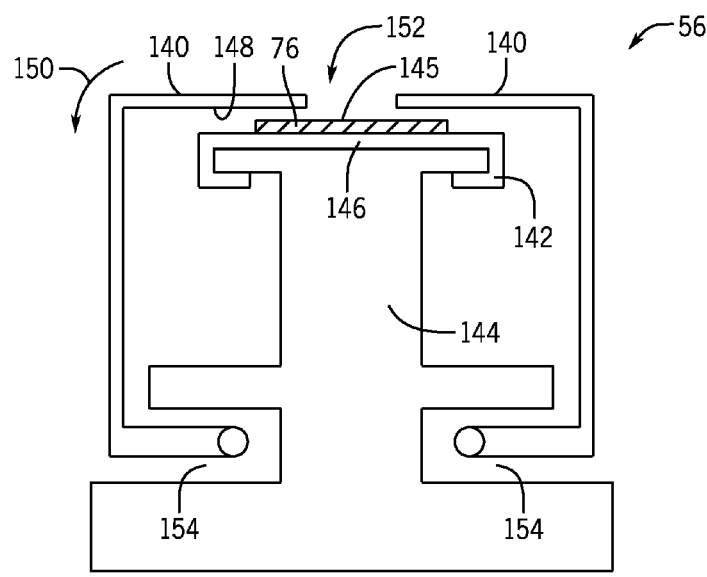
FIG. 7 is a cross-sectional view of an embodiment of a track configured to facilitate strapping bales of material.

FIG. 7 is a cross-sectional view of an embodiment of the track 56 that may be used in the baler 10. As shown, the track 56 includes two generally opposed members 140 biased (e.g., spring loaded) toward one another. A slide 142 is coupled to or mounted on a support piece 144 and positioned between the opposed members 140. In operation, the strap 76 moves through the track 56 in a space 145 between an outer surface 146 of the slide 142 and an inner surface 148 of the opposed members 140. The opposed members 140 may generally block movement of the strap 76 away from the slide 142 and contain the strap 56 within the track 56 as the strap 76 is fed or propelled along the track 56. The track 56 is configured to release the strap 76 when tension is applied to the strap 76. For example, when the strap 76 is pulled in a direction 152 away from the slide 142, the strap 76 causes the opposed members 140 to move as shown by arrow 150 via rotation about a pivot 154, and the strap 76 passes between the opposed members 140 and separates from the track 56. As discussed in more detail below, movement of the rear door 52 from the closed position 92 to the open position 120 while the gripping assembly 88 of the needle 82 grips the strap 76 may cause the strap 76 to separate from (e.g., be drawn out of or release from) the track 56. For example, the strap 76 may pass between the opposed members 140 (e.g., the opposed member 140 may rotate about the pivot 154 to enable the strap 76 to separate from the track 56) as the rear door 52 is moved from the closed position 92 to the open position 120. In other embodiments, the rear door 52 may be moved from the closed position 92 to the open position 120 after the strap 76 is transferred by the needle 82 to surround the baling chamber 14 (e.g., an end of the strap 76 may be positioned in the sealing assembly 80). In such cases, the sealing assembly 80 may grip the strap 76 and movement of the rear door from the closed position 92 to the open position 120 while the sealing assembly 80 grips the end of the strap 76 causes the strap 76 to separated from the track 56. The strap 76 illustrated in FIG. 7 has a generally rectangular cross-sectional shape. However, as discussed above, the strap 76 may have any of a variety of cross-sectional shapes, such as a generally round or circular cross-sectional shape. Thus, in certain embodiments, the track 56 may be adapted to receive, contain, guide, and/or release the strap 76 having any of a variety of cross-sectional shapes in the manner disclosed herein. For example, the space 145 between the outer surface 146 of the slide 142 and the inner surface 148 of the opposed members 140 may be configured to accommodate straps 76 of one or more various cross-sectional shapes.

Figure 8:
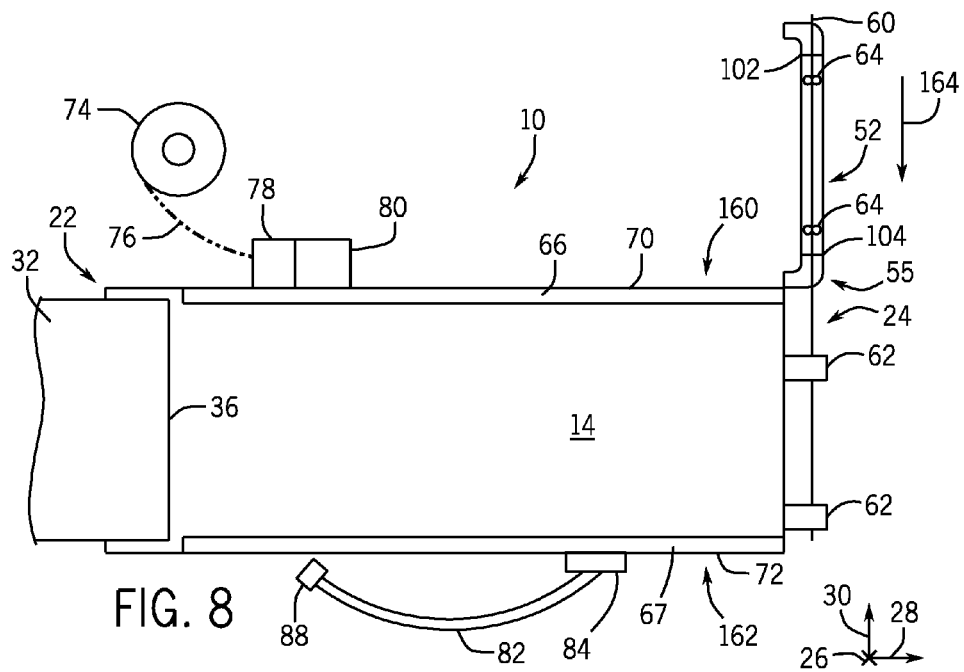
FIG. 8 is a side cross-sectional view of the baler of FIG. 3, in which the rear door is in an open position prior to strapping a bale of material.

FIG. 8 is a side cross-sectional view of the baler 10 of FIG. 3, in which the rear door 52 is in the open position 120 prior to strapping a bale of material. As shown, when the rear door 52 is in the open position 120, the rear door 52 does not block the second end 24 of the baling chamber 14, and thus, material (e.g., compressible material or bales of material) may exit the baling chamber 14 through the second end 24 of the baling chamber 14. Additionally, when the door 52 is in the open position 120, the second end 55 of the rear door 52 is positioned proximate to the top wall 70, or a first side 160, of the baling chamber 14. As discussed above with respect to FIG. 3, the spool 74, the strap feeding assembly 78, and the sealing assembly 80 are provided on the first side 160 of the baling chamber 14, in the illustrated embodiments. Before material accumulates in the baling chamber 14, or at a certain time after a previous bale is evacuated from the baling chamber 14, the rear door 52 may move vertically (e.g., along the vertical axis 30) along the rails 60 in a downward direction 164 to the closed position 92.

Figure 9:
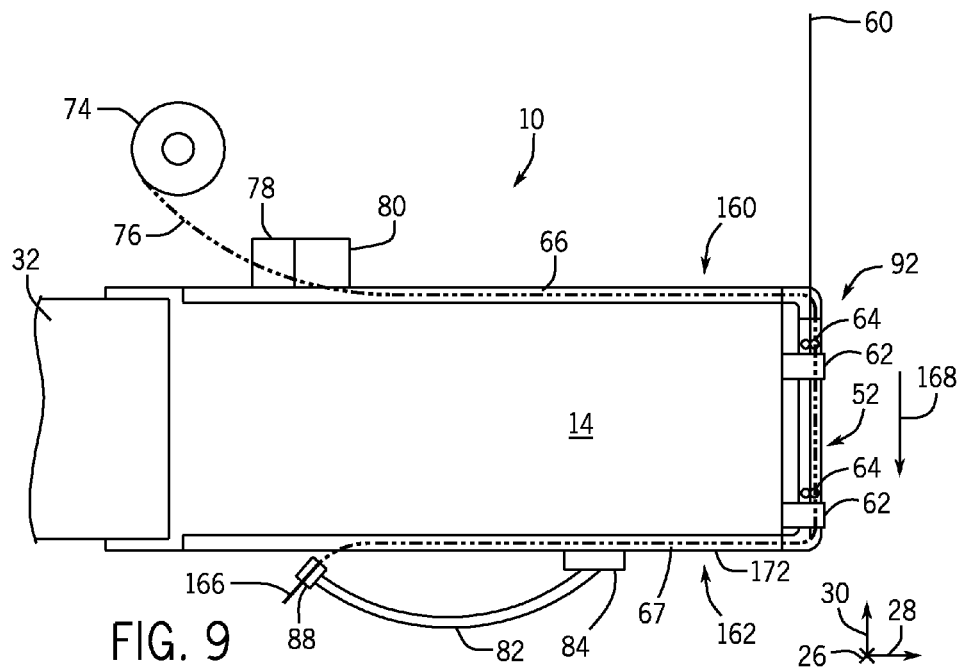
FIG. 9 is a side cross-sectional view of the baler of FIG. 3, in which the rear door is in a closed position to facilitate transfer of a strap from a first side of the baling chamber to a second side of the baling chamber.

FIG. 9 is a side cross-sectional view of the baler 10 of FIG. 3, in which the rear door 52 is in the closed position 92 to facilitate transfer of the strap 76 from the first side 160 of the baling chamber 14 to the second side 162 of the baling chamber 14. As discussed above, the rear door 52 may be removably inserted into the baling chamber 14 or removably placed proximate to the second end 24 of the baling chamber 14. The rear door 52 moves or slides along the vertical axis 30 from the open position 120 to the closed position 92. When the rear door 52 is in the closed position 92, as shown, the rear door 52 blocks material from exiting the baling chamber 14 at the second end 24 of the baling chamber 14. Further, when the rear door 52 is in the closed position 92, the rear door 52 extends from the first side 160 to the second side 162 of the baling chamber 14 and facilitates transfer of the strap 76 from the first side 160 to the second side 162. Thus, when the door 52 is in the closed position 92, the strap 76 may be transferred from the top tracks 66 of the top wall 70 to the bottom tracks 67 of the bottom wall 72 via the tracks 56 of the rear door 52.

In the illustrated embodiment, the strap feeding assembly 78 is configured to propel an end 166 of the strap 76 around at least a portion of the baling chamber 14 (e.g., through the top track 66 of the top wall 70, the track 56 of the rear door 52, and/or the bottom track 67 of bottom wall 72). The rear door 52 may have any of a variety of configurations to facilitate transferring the strap 76 from the first side 160 to the second side 162 of the baling chamber 14. For example, each of the connecting elements 106 of the rear door 52 may include the generally horizontal portion 108 and the generally vertical portion 110. When the rear door 52 extends across the baling chamber 14, the generally horizontal portions 110 of the connecting elements 106 align with the corresponding top tracks 66 of the top wall 70 and the corresponding bottom tracks 67 of the bottom wall 72. Thus, the tracks 56 of the rear door 52 may be aligned with the top tracks 66 via the connecting elements 106, and the strap feeding assembly 78 may direct and/or propel an end 166 of the strap 76 from the top track 66, into the connecting element 106, and into the track 56 of the rear door 52. The end 166 of the strap 76 may then be propelled and/or routed through the track 56 of the rear door 52 toward the second side 160 of the baling chamber 14, as shown by arrow 168.

The baler 10 of FIG. 9 also includes the bottom track 67 extending along the bottom wall 72 of the baling chamber 14. The end 166 of the strap 76 may be transferred to the bottom track 67 of the bottom wall 72 from the track 56 of the rear door 52 via the connecting element 106. The end 166 of the strap 76 may then be passed to the needle 82 provided on the second side 162 of the baling chamber 14. The needle 82 may have any suitable form that enables the needle 82 to receive the strap 76 (e.g., the end 166 of the strap 76) and to grip the strap 76 while the material accumulates in the baling chamber 14, for example. As shown, the needle 82 includes the gripping assembly 88 that may generally be configured to grip (e.g., releasably grip or hold) the strap 76.

In operation, once the strap 76 is gripped by the gripping assembly 88, the strap feeding assembly 78 may stop propulsion of the strap 76 and/or may block additional length of the strap 76 from being drawn from the spool 74. In certain embodiments, after the gripping assembly 88 of the needle 82 receives and grips the strap 56, the rear door 52 may move from the closed position 92 to the open position 120. The rear door 52 may be moved between the closed position 92 and the open position 120 via any suitable mechanism. For example, the rear door 52 may be coupled to the one or more actuators 59 configured to move the rear door 52 upwardly relative to the baling chamber 14, as discussed above. As the rear door 52 is withdrawn from the baling chamber 14, the strap 76 may be removed or drawn out (e.g., pulled out) of the track 56 of the rear door 52 as discussed above with respect to FIG. 7, and the strap 56 may remain extended across the second end 24 of the baling chamber 14 (e.g., may extend from the first side 160 to the second side 162 of the baling chamber 14).

In some embodiments, as the rear door 52 is moved to the open position 120, tension or force from the strap 76 against the opposed members 140 (as shown in FIG. 7) may cause the opposed members 140 to separate and enable the strap 76 to be removed from the track 56 and/or to contact the material accumulating within the baling chamber 14. Although the opposed members 140 may be configured to open and to release the strap 76 from the track 56 due to tension or force applied by the strap 76, it should be understood that the opposed members 140 may be actuated, in certain embodiments. Further, it should be understood that while the rear door 52 may move from the closed position 92 to the open position 120 once the gripping assembly 88 receives and grips the strap 76 (e.g., the rear door 52 moves to the open position 120 in response to the gripping assembly 88 gripping the strap 76 or at a predetermined time after the gripping assembly 88 grips the strap 76), in some embodiments, the rear door 52 may be configured to move to the open position 120 after material accumulates in the baling chamber 14 or after a certain density of material is achieved. In such cases, the rear door 52 may support the material as the material accumulates in the baling chamber 14.

Figure 10:
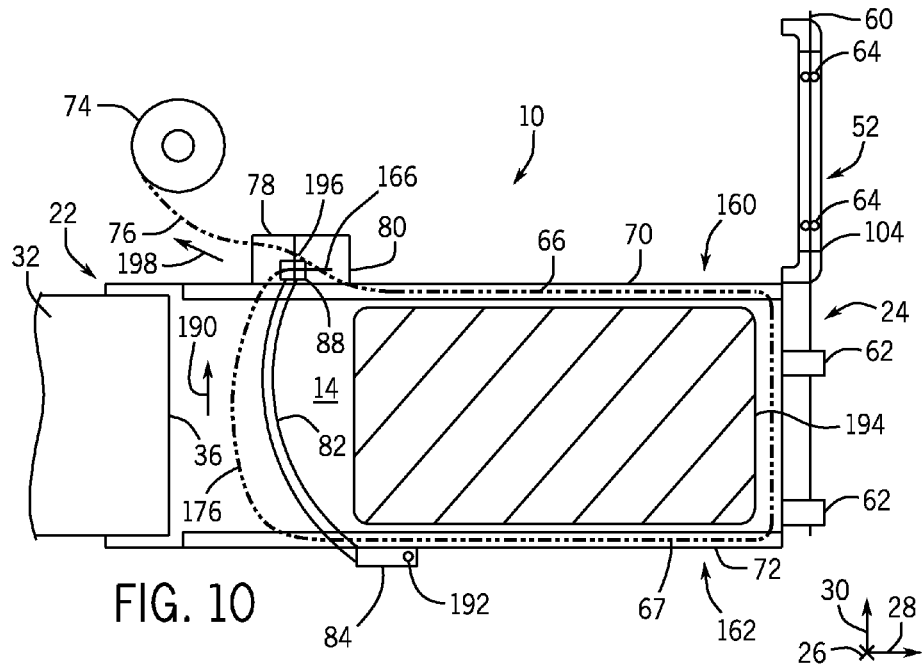
FIG. 10 is a side cross-sectional view of the baler of FIG. 3, in which the rear door is in the open position after releasing the strap from a track of the rear door and a needle is in a raised position to transfer the strap to a sealing assembly to seal the strap around the bale of material.

FIG. 10 is a side cross-sectional view of the baler 10 of FIG. 3, in which the rear door 52 is in the open position 120 after releasing the strap 76 from the track 56 of the rear door 52 and the needle 82 is in a raised positioned to transfer the strap 76 to the sealing assembly 80 to seal the strap 76 around the bale of material. In general, once the bale within the baling chamber 14 reaches a desired size and/or density, the strapping process may be completed. As shown, the gripping assembly 88 of the needle 82 grips the end 166 of the strap 76, and the needle 82 moves (e.g., rotates and/or translates) through the baling chamber 14 as indicated by arrow 190. The needle 82 may be coupled to an arm 84 which rotates about a hinge 192 to move the needle 82 through the baling chamber 14, as shown. Thus, the needle 82 brings the strap 76 from the second side 162 of the baling chamber 14 to the first side 160 of the baling chamber 14. In certain embodiments, the needle 82 may move between the second side 162 and first side 160, or vice versa, through a slot 38 of the forward plunger 32. Such a configuration provides a path for the needle 82 to move through the baling chamber 14 and enables the forward plunger 36 to maintain contact with (e.g., engage) the bale, thereby maintaining the shape of the bale while the needle 82 moves the strap 76 around the bale. Additionally, the needle 82 may be configured to pull or to draw the strap 76 from the strap feeding assembly 78, in certain embodiments. Thus, the strap feeding assembly 78 may release tension on the strap 78, enabling the needle 82 to draw the strap 56 around the baling chamber 14 to surround a bale 194.

In the illustrated embodiment, the needle 82 directs or transfers the end 166 of the strap 76 into the sealing assembly 80. In some embodiments, the end 166 of the strap 76 may extend approximately 30 cm or less from the gripping assembly 88. When the end 166 of the strap 76 is transferred to the sealing assembly 80, the gripping assembly 88 of the needle 82 releases the strap 76. The sealing assembly 80 holds the received end 166 of the strap 76 and brings the end 166 into contact with a portion 196 of the strap 76 already disposed within the sealing assembly 80. In certain embodiments, the strap feeding assembly 78 may retract (e.g., pull back) on the strap 76 as indicated by arrow 198, thus tightening the strap 76 around the bale prior to the strap 76 being sealed. The sealing assembly 80 may seal the end 166 to the portion 196 of the strap 76, thus sealing the strap 76 into a loop around the bale within the baling chamber 14. Through such techniques, the bale is strapped without a tying step (e.g., without tying or knotting a binding material, such as twine) and/or without direct operator interaction with or manipulation of the strap 76, for example. Additionally, although the rear door 52 is shown in the open position 120, as noted above, in certain embodiments, the rear door 52 may remain in the closed position 92 until the end 166 of the strap 76 is transferred to the sealing assembly 80. In such cases, the strap 76 may be released from the tracks 56 of the rear door 52 as the needle 82 transfers the strap 76 to the sealing assembly 80 and/or as the strap feeding assembly 78 pulls the strap 76 as shown by arrow 198, for example.

Figure 11:
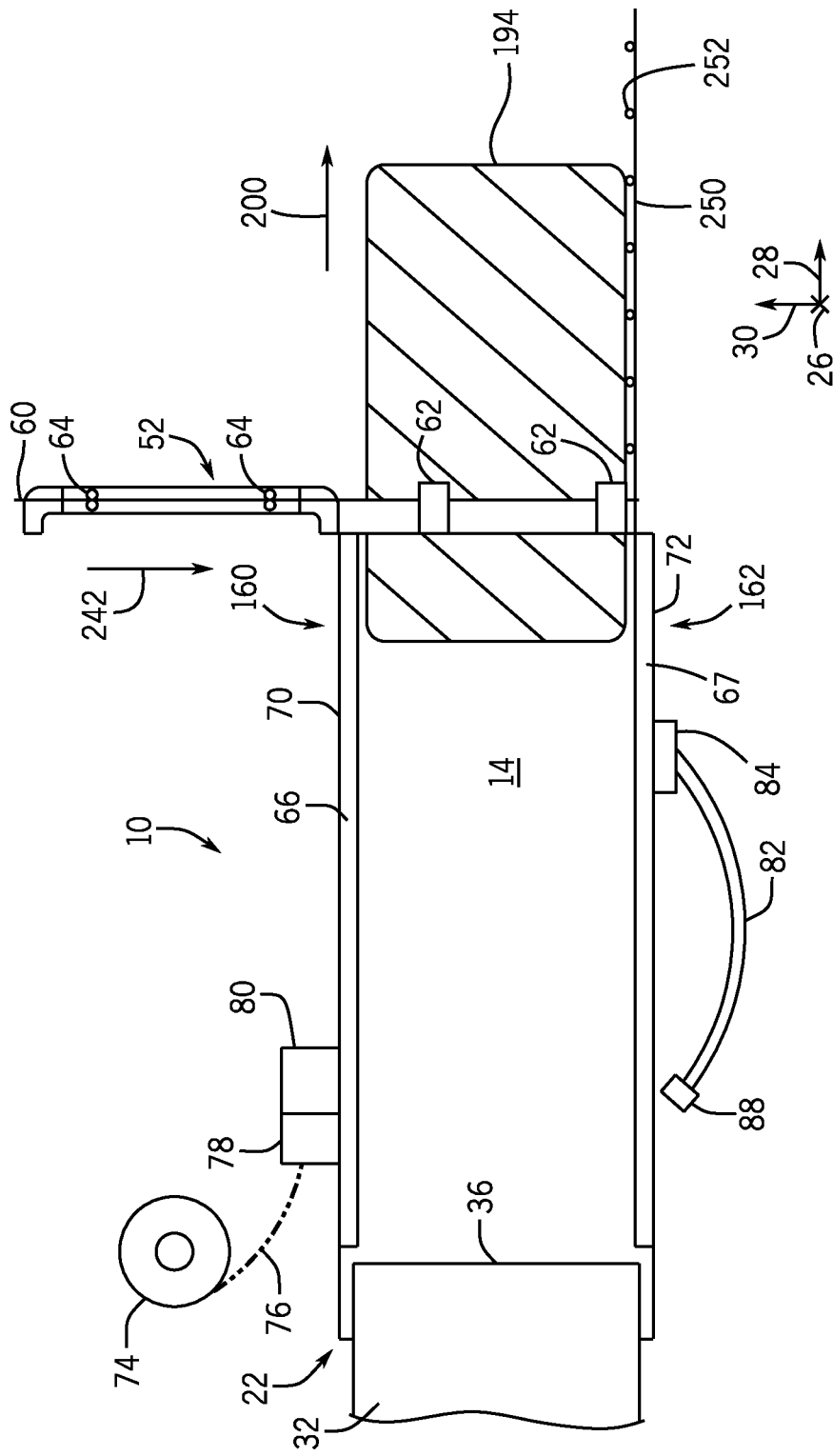
FIG. 11 is a side cross-sectional view of the baler of FIG. 3, in which the rear door is in an open position to enable the strapped bale to exit the baling chamber.

FIG. 11 is a side cross-sectional view of the baler 10 of FIG. 3, in which the rear door 52 is in the open position 120 to enable the strapped bale 194 to exit the baling chamber 14. As shown, the needle 82 may be moved (e.g., retracted, rotated, etc.) through the baling chamber 14 from the first side 160 to the second side 162 in preparation for strapping a subsequent bale. In some embodiments, the bale 194 may be conveyed (e.g., pulled, transported, and so forth) from the baling chamber 14 as shown by arrow 200 once the strap 76 is sealed around the bale 194. Any suitable mechanism may be utilized to remove the bale 194 from the baling chamber 14. For example, a conveyor 250 (e.g., a belt, track, chain etc.) may be provided adjacent or along the second side 162 of the baling chamber 14 to facilitate removal of the bale from the baling chamber 14. The conveyor 250 may have a textured surface 252 (e.g., including protrusions, dogs, etc.) configured to engage the bale 194 and to facilitate removal of the bale 194 from the baling chamber 14. Thus, after the strap 76 is placed around the bale, the conveyor 250 may urge the bale toward the second end 24 of the baling chamber 14, thereby pulling the bale out of the baling chamber 14 rearwardly. Conveying the bale 194 from the baling chamber 14 may create a gap between the strapped bale 194 and material flowing into baling chamber 14 to enable the rear door 52 to move from the open position 120 to the closed position 92 to facilitate strapping a subsequent bale, as described above with respect to FIGS. 8-11.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural baler comprising:
    a baling chamber configured to receive a compressible material, the baling chamber defined by a frame and having a fixed track extending along a longitudinal axis of the baling chamber;
    a rear door configured to move along a vertical axis of the baling chamber between a closed position and an open position, wherein the rear door comprises a moveable track configured to align with the fixed track to facilitate transfer of a strap from the fixed track to the movable track of the rear door while the rear door is in the closed position relative to the baling chamber;
    a strap feeding assembly coupled to the frame and configured to propel the strap through the fixed track and through the movable track while the rear door is in the closed position relative to the baling chamber; and
    a needle coupled to a second side of the baling chamber and having a gripping assembly configured to receive and to grip an end of the strap after the strap propelled through the moveable track of the rear door, wherein moving the rear door from the closed position to the open position relative to the baling chamber while the end of the strap is gripped by the gripping assembly causes the strap to release from the movable track.

2. The agricultural baler of claim 1, wherein the rear door is configured to slide along rails extending along the vertical axis and coupled to the frame.

3. The agricultural baler of claim 1, wherein the moveable track comprises opposed members that are configured to retain the strap within the movable track while the rear door is in the closed position and that are configured to move away from one another to enable release of the strap from the movable track as the rear door moves from the closed position to the open position.

4. The agricultural baler of claim 1, wherein the strap is a wire having a substantially round cross-sectional shape.

5. The agricultural baler of claim 1, wherein the movable track comprises opposed members that are configured to retain the strap within the movable track while in a first position and that configured to be actuated to move away from one another to a second position to enable release of the strap from the movable track.

6. The agricultural baler of claim 1, comprising a sealing assembly coupled to the agricultural baler and configured to seal an end of the strap to a portion of the strap within the sealing assembly to form a sealed loop surrounding the compressible material.

7. A method for baling an agricultural crop material comprising:
    moving a rear door from an open position to a closed position relative to a baling chamber of a baler, wherein the rear door blocks the agricultural crop material from exiting the baling chamber while in the closed position, and enables the agricultural crop material to exit the baling chamber while in the open position;
    feeding an end of a strap into a track of the rear door, while the rear door is in the closed position;
    propelling the end of the strap through the track of the rear door from a first side of the baling chamber to a second side of the baling chamber, opposite the first side, while the rear door is in the closed position relative to the baling chamber using a strap feeding assembly coupled to the baler; and
    moving the rear door from the closed position to the open position relative to the baling chamber while the end of the strap is gripped by an assembly coupled to the baler to cause the strap to release from the track to facilitate surrounding a bale of the agricultural crop material with the strap.

8. The method of claim 7, wherein the assembly comprises a gripping assembly of a needle, and the method comprises transferring the end of the strap from the second side of the baling chamber to the first side of the baling chamber via the needle.

9. The method of claim 7, further comprising sealing the end of the strap to a portion of the strap using a sealing assembly coupled to the baler to form a sealed loop surrounding the material.

10. The method of claim 7, comprising moving the rear door from the closed position to the open position in response to achievement of a certain density of the bale of the agricultural crop material within the baling chamber.

11. The method of claim 7, comprising baling the agricultural crop material via moving the rear door from the open position to the closed position relative to the baling chamber of the baler, feeding the end of the strap into the track of the rear door, propelling the end of the strap through the track of the rear door while the rear door is in the closed position relative to the baling chamber using the strap feeding assembly coupled to the baler, and moving the rear door from the closed position to the open position relative to the baling chamber while the end of the strap is gripped by the assembly coupled to the baling chamber to cause the strap to release from the track to facilitate surrounding the bale of the agricultural crop material with the strap as the baler travels through an agricultural field.

* * * * *